United States Patent
Banjoya et al.

(10) Patent No.: US 12,522,457 B2
(45) Date of Patent: Jan. 13, 2026

(54) MULTIFEED DETECTION DEVICE AND MULTIFEED DETECTION METHOD

(71) Applicant: Glory Ltd., Himeji (JP)

(72) Inventors: Toshihiko Banjoya, Himeji (JP); Ryo Ikemoto, Himeji (JP)

(73) Assignee: GLORY LTD., Himeji (JP)

( * ) Notice: Subject to any disclaimer, the term of this patent is extended or adjusted under 35 U.S.C. 154(b) by 131 days.

(21) Appl. No.: 18/374,127

(22) Filed: Sep. 28, 2023

(65) Prior Publication Data
US 2024/0029497 A1     Jan. 25, 2024

Related U.S. Application Data (63) Continuation of application No. PCT/JP2022/014469, filed on Mar. 25, 2022.

(30) Foreign Application Priority Data

Mar. 29, 2021 (JP) .................. 2021-055505

(51) Int. Cl.
| | |
|---|---|
| *B65H 7/12* | (2006.01) |
| *B65H 7/14* | (2006.01) |
| *G01N 21/55* | (2014.01) |
| *G06N 20/00* | (2019.01) |
| *G07D 7/12* | (2016.01) |

(Continued)

(52) U.S. Cl.
CPC .............. *B65H 7/125* (2013.01); *B65H 7/14* (2013.01); *G01N 21/55* (2013.01); *G06N 20/00* (2019.01); *G07D 7/12* (2013.01); *G07D 7/183* (2017.05); *G07D 11/237* (2019.01); *B65H 2553/412* (2013.01); *B65H 2553/414* (2013.01);

(Continued)

(58) Field of Classification Search
CPC ...... B65H 7/125; B65H 7/14; B65H 2553/41; B65H 2553/412; B65H 2553/414; G07D 11/237; G07D 7/183; G01N 2021/558
See application file for complete search history.

(56) References Cited

U.S. PATENT DOCUMENTS

| | | | |
|---|---|---|---|
| 2006/0115138 A1* | 6/2006 | Klock .................... | B65H 7/125 382/137 |
| 2011/0128526 A1 | 6/2011 | Nireki | |

FOREIGN PATENT DOCUMENTS

| | | |
|---|---|---|
| DE | 10 2005 009332 A1 | 9/2006 |
| JP | S51-7021 B1 | 3/1976 |

(Continued)

OTHER PUBLICATIONS

International Search Report and Written Opinion mailed on Jun. 14, 2022, received for PCT Application PCT/JP2022/014469, filed on Mar. 25, 2022, 9 pages including English Translation.

*Primary Examiner* — Jeremy R Severson
(74) *Attorney, Agent, or Firm* — XSENSUS LLP (57) ABSTRACT

A multifeed detection device according to the present disclosure includes: a light source configured to irradiate a sheet with light; a light receiver configured to receive transmission light transmitted through a sheet and reflection light reflected by a sheet; and a controller configured to acquire, from the light receiver, transmission output data that is output data of the transmission light and reflection output data that is output data of the reflection light, the controller being configured to determine whether or not a multifeed of sheets has occurred based on the transmission output data and the reflection output data.

5 Claims, 5 Drawing Sheets

(51) Int. Cl.
*G07D 7/183* (2016.01)
*G07D 11/237* (2019.01)
(52) U.S. Cl.
CPC ............... *B65H 2701/1912* (2013.01); *G01N 2021/558* (2013.01); *G07D 2211/00* (2013.01)

(56) References Cited

FOREIGN PATENT DOCUMENTS

| | | | |
|---|---|---|---|
| JP | S57-184041 | A | 11/1982 |
| JP | 2010-026850 | A | 2/2010 |
| JP | 2012-035953 | A | 2/2012 |
| JP | 6455999 | B2 | 1/2019 |

\* cited by examiner

MULTIFEED DETECTION DEVICE AND MULTIFEED DETECTION METHOD

CROSS-REFERENCE TO RELATED APPLICATIONS

The present application is a Continuation application of PCT Application No. PCT/JP2022/014469 filed on Mar. 25, 2022, and claims priority to Japanese Patent Application No. 2021-055505 filed on Mar. 29, 2021 under the Paris Convention and provisions of national law in a designated State. The entire contents of the applications are hereby incorporated by reference.

TECHNICAL FIELD

The present disclosure relates to multifeed detection devices, multifeed detection methods, and multifeed detection programs.

BACKGROUND

For example, JP 6455999 B discloses a technique in which an optical multifeed detection sensor including a light-emitting element and a light receiving element that are disposed across a transport unit is used to detect whether one banknote is transported, two overlaid banknotes are transported, or three or more overlaid banknotes are transported based on the level of decrease in quantity of light received by the light receiving element during emission from the light-emitting element.

SUMMARY

A first aspect of the present disclosure is directed to a multifeed detection device including: a light source configured to irradiate a sheet with light; a light receiver configured to receive transmission light transmitted through a sheet and reflection light reflected by a sheet; and a controller configured to acquire, from the light receiver, transmission output data that is output data of the transmission light and reflection output data that is output data of the reflection light, the controller being configured to determine whether or not a multifeed of sheets has occurred based on the transmission output data and the reflection output data.

A second aspect of the present disclosure is directed to a multifeed detection method including the steps of: (A) acquiring, from a light receiver having received transmission light emitted from a light source and transmitted through a sheet, transmission output data that is output data of the transmission light; (B) acquiring, from the light receiver having received reflection light emitted from the light source and reflected by a sheet, reflection output data that is output data of the reflection light; and (C) determining whether or not a multifeed of sheets has occurred based on the transmission output data and the reflection output data.

A third aspect of the present disclosure is directed to a multifeed detection program that detects occurrence of a multifeed using a multifeed detection device, the program causing the multifeed detection device to execute the processings of: (A) acquiring, from a light receiver having received transmission light emitted from a light source and transmitted through a sheet, transmission output data that is output data of the transmission light; (B) acquiring, from the light receiver having received reflection light emitted from the light source and reflected by a sheet, reflection output data that is output data of the reflection light; and (C) determining whether or not a multifeed of sheets has occurred based on the transmission output data and the reflection output data.

DESCRIPTION OF EMBODIMENTS

For example, the quantity of light transmitted through a soiled note is smaller than that transmitted through a banknote that is not a soiled note. Thus, it is difficult to accurately detect occurrence of a multifeed where two or more overlaid banknotes are transported, based only on the quantity of light transmitted through banknotes.

In response to the above current state of the art, the present disclosure aims to provide a multifeed detection device, a multifeed detection method, and a multifeed detection program that can more accurately detect a multifeed of sheets.

(1) In order to solve the above issue and to achieve the object, a first aspect of the present disclosure is directed to a multifeed detection device including: a light source configured to irradiate a sheet with light; a light receiver configured to receive transmission light transmitted through a sheet and reflection light reflected by a sheet; and a controller configured to acquire, from the light receiver, transmission output data that is output data of the transmission light and reflection output data that is output data of the reflection light, the controller being configured to determine whether or not a multifeed of sheets has occurred based on the transmission output data and the reflection output data.

(2) In the multifeed detection device of (1) above, the light receiver may include a plurality of light receiving pixels, the transmission output data may be transmission image data including output data from the plurality of light receiving pixels, the reflection output data may be reflection image data including output data from the plurality of light receiving pixels, the controller may be configured to determine whether or not a multifeed has occurred for each unit pixel based on the transmission image data and the reflection image data, and the controller may be configured to determine whether or not a multifeed of sheets has occurred based on a result of the determination.

(3) In the multifeed detection device of (2) above, the controller may be configured to determine that a multifeed has occurred at a unit pixel in question when determining that a multifeed has occurred at the unit pixel in question and more than a predetermined number of unit pixels for which the controller determines that a multifeed has occurred is present around the unit pixel in question.

(4) In the multifeed detection device of (2) or (3) above, the controller may be configured to determine whether or not a multifeed has occurred for each unit pixel based on a recognition function.

(5) In the multifeed detection device of (4) above, the recognition function may be based on a machine-learned function generated using one-sheet data based on transmission image data and reflection image data of one fit sheet of a certain type and two-sheet data based on transmission output data and reflection output data of two fit sheets of the certain type.

(6) In the multifeed detection device of (5) above, the recognition function may pass through a position corresponding to $\mu+k\times\sigma$, where $\mu$ and $\sigma$ respectively represent an average and a standard deviation of output value distribution obtained by inputting the two-sheet data into the machine-learned function, and k represents a coefficient of 1 or greater and 3 or smaller.

(7) In the multifeed detection device of any one of (1) to (6) above, the light receiver may be configured to use a same light receiving element to receive the transmission light and the reflection light.

(8) In the multifeed detection device of any one of (1) to (7) above, the transmission light and the reflection light may be based on lights having the same wavelength emitted from the light source.

(9) A second aspect of the present disclosure is directed to a multifeed detection method including the steps of: (A) acquiring, from a light receiver having received transmission light emitted from a light source and transmitted through a sheet, transmission output data that is output data of the transmission light; (B) acquiring, from the light receiver having received reflection light emitted from the light source and reflected by a sheet, reflection output data that is output data of the reflection light; and (C) determining whether or not a multifeed of sheets has occurred based on the transmission output data and the reflection output data.

(10) In the multifeed detection method of (9) above, the light receiver may include a plurality of light receiving pixels, the transmission output data may be transmission image data including output data from the plurality of light receiving pixels, the reflection output data may be reflection image data including output data from the plurality of light receiving pixels, and the step (C) may include a step (C1) of determining whether or not a multifeed has occurred for each unit pixel based on the transmission image data and the reflection image data, and a step (C2) of determining whether or not a multifeed of sheets has occurred based on a result of the determination.

(11) In the multifeed detection method of (10) above, the step (C1) may include determining that a multifeed has occurred at a unit pixel in question when a determination is made that a multifeed has occurred at the unit pixel in question and more than a predetermined number of unit pixels for which a determination is made that a multifeed has occurred is present around the unit pixel in question.

(12) In the multifeed detection method of (10) or (11) above, the step (C1) may include determining whether or not a multifeed has occurred for each unit pixel based on a recognition function.

(13) In the multifeed detection method of (12) above, the recognition function may be based on a machine-learned function generated using one-sheet data based on transmission image data and reflection image data of one fit sheet of a certain type and two-sheet data based on transmission output data and reflection output data of two fit sheets of the certain type.

(14) In the multifeed detection method of (13) above, the recognition function may pass through a position corresponding to $\mu+k\times\sigma$, where $\mu$ and $\sigma$ respectively represent an average and a standard deviation of output value distribution obtained by inputting the two-sheet data into the machine-learned function, and k represents a coefficient of 1 or greater and 3 or smaller.

(15) In the multifeed detection method of any one of (9) to (14) above, the light receiver may be configured to use a same light receiving element to receive the transmission light and the reflection light.

(16) In the multifeed detection method of any one of (9) to (15) above, the transmission light and the reflection light may be based on lights having the same wavelength emitted from the light source.

(17) A third aspect of the present disclosure is directed to a multifeed detection program that detects occurrence of a multifeed using a multifeed detection device, the program causing the multifeed detection device to execute the processings of: (A) acquiring, from a light receiver having received transmission light emitted from a light source and transmitted through a sheet, transmission output data that is output data of the transmission light; (B) acquiring, from the light receiver having received reflection light emitted from the light source and reflected by a sheet, reflection output data that is output data of the reflection light; and (C) determining whether or not a multifeed of sheets has occurred based on the transmission output data and the reflection output data.

(18) In the multifeed detection program of (17) above, the light receiver may include a plurality of light receiving pixels, the transmission output data may be transmission image data including output data from the plurality of light receiving pixels, the reflection output data may be reflection image data including output data from the plurality of light receiving pixels, and the processing (C) may include a processing (C1) of determining whether or not a multifeed has occurred for each unit pixel based on the transmission image data and the reflection image data, and a processing (C2) of determining whether or not a multifeed of sheets has occurred based on a result of the determination.

(19) In the multifeed detection program of (18) above, the processing (C1) may include determining that a multifeed has occurred at a unit pixel in question when a determination is made that a multifeed has occurred at the unit pixel in question and more than a predetermined number of unit pixels for which a determination is made that a multifeed has occurred is present around the unit pixel in question.

(20) In the multifeed detection program of (18) or (19) above, the processing (C1) may include determining whether or not a multifeed has occurred for each unit pixel based on a recognition function.

(21) In the multifeed detection program of (20) above, the recognition function may be based on a machine-learned function generated using one-sheet data based on transmission image data and reflection image data of one fit sheet of a certain type and two-sheet data based on transmission output data and reflection output data of two fit sheets of the certain type.

(22) In the multifeed detection program of (21) above, the recognition function may pass through a position corresponding to $\mu+k\times\sigma$, where $\mu$ and $\sigma$ respectively represent an average and a standard deviation of output value distribution obtained by inputting the two-sheet data into the machine-learned function, and k represents a coefficient of 1 or greater and 3 or smaller.

(23) In the multifeed detection program of any one of (17) to (22) above, the light receiver may be configured to use a same light receiving element to receive the transmission light and the reflection light.

(24) In the multifeed detection program of any one of (17) to (23) above, the transmission light and the reflection light may be based on lights having the same wavelength emitted from the light source.

The present disclosure can provide a multifeed detection device, a multifeed detection method, and a multifeed detection program that can more accurately detect a multifeed of sheets.

Hereinafter, embodiments of a multifeed detection device, a multifeed detection method, and a multifeed detection program according to the present disclosure are described with reference to the drawings. Various sheets such as banknotes, checks, vouchers, bills, business forms, documents of value, and card-like media are applicable as sheets used in the present disclosure. Devices for banknotes are used hereinbelow as examples to describe the present disclosure. The multifeed detection program may be preinstalled in the multifeed detection device or may be provided to the operator as a program stored in a computer-readable storage device or via the network. The same components or components having similar functions in the following description are commonly assigned with the same reference sign throughout the drawings as appropriate, and description thereof is omitted as appropriate. Drawings showing a structure appropriately include the XYZ coordinate system where the XYZ axes are perpendicular to one another.

Embodiment 1

Figure 1:
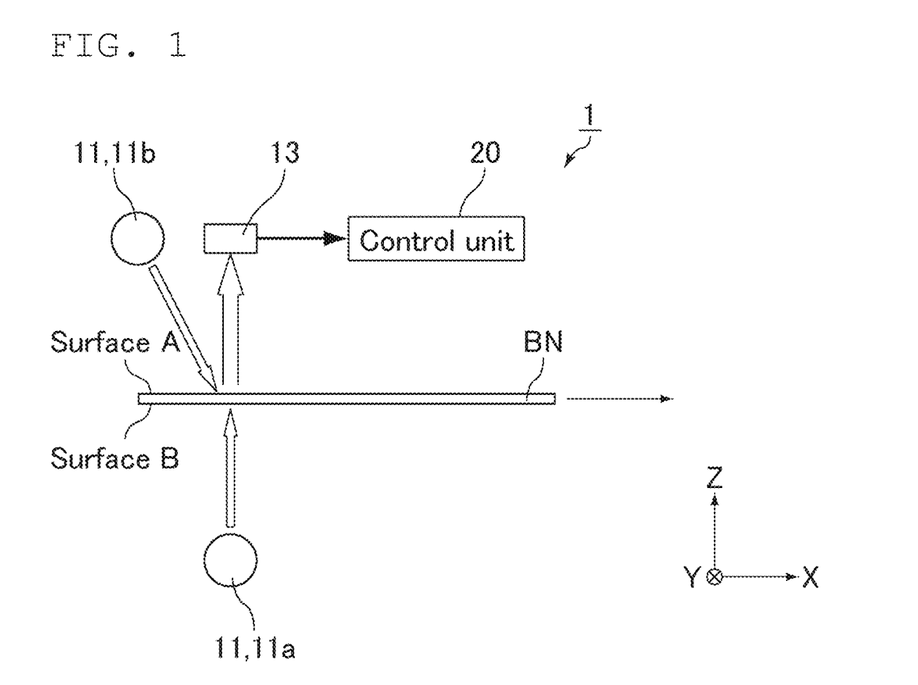
FIG. 1 is a schematic side view of the transport path for banknotes, showing an example of the configuration of a multifeed detection device according to Embodiment 1.

The configuration of a multifeed detection device according to the present embodiment is described with reference to FIG. 1. FIG. 1 is a schematic side view of the transport path for banknotes, showing an example of the configuration of the multifeed detection device according to Embodiment 1. As shown in FIG. 1, a multifeed detection device 1 according to the present embodiment includes a light source 11 that irradiates a banknote BN with light; a light receiving unit (light receiver) 13 that receives transmission light transmitted through a banknote BN and reflection light reflected by the banknote BN; and a control unit (controller) 20 that acquires, from the light receiving unit 13, transmission output data that is output data of transmission light received by the light receiving unit 13 and reflection output data that is output data of reflection light received by the light receiving unit 13. The multifeed detection device 1, for example, is mountable on a sheet handling device for handling banknotes. Banknotes BN to be recognized may be transported in the X direction in the XY plane.

The light source 11 irradiates banknotes BN with light. The light source 11 irradiates one main surface (hereinafter, surface A) of each banknote BN and the other main surface (hereinafter, surface B) of the banknote BN, and may include, as shown in FIG. 1, a light source 11a and a light source 11b. The light source 11a and the light receiving unit 13 are on opposite sides of the banknote BN. The light source 11b and the light receiving unit 13 are on the same side of the banknote BN. Transmission light emitted from the light source 11 (11a) to the surface B of the banknote BN and transmitted through the banknote BN and reflection light emitted from the light source 11 (11b) and reflected by the surface A of the banknote BN may each be received by the light receiving unit 13.

Light emitted from the light source 11 may be light in a wavelength band including the peak wavelength and the wavelengths around the peak wavelength. The type (wavelength) of light emitted from the light source 11 is not limited. Examples of the light include white light, red light, green light, blue light, and other visible light, and infrared light.

The light sources 11a and 11b may emit lights having wavelengths different from each other or may emit lights having the same wavelength (e.g., green light or infrared light). In the latter case, the light sources 11a and 11b may emit lights having the same wavelength at different timings. Specifically, the irradiation periods of lights having the same wavelength respectively emitted from the light source 11a and the light source 11b may not coincide with each other. The "irradiation period" means the period from the start of irradiation with light to the end of the irradiation.

The light receiving unit 13 receives transmission light transmitted through the banknote BN and reflection light reflected by the banknote BN. In other words, the light receiving unit 13 can function as an optical sensor. The light receiving unit 13 may receive transmission light emitted from the light source 11 (11a) to the surface B of the banknote BN and transmitted through the banknote BN and reflection light emitted from the light source 11 (11b) and reflected by the surface A of the banknote BN. In other words, the light receiving unit 13 may receive transmission light emitted from the light source 11 (11a) to the surface B of the banknote BN and transmitted through the banknote BN during the emission of light from the light source 11 (11a), and light emitted from the light source 11 (11b) and reflected by the surface A of the banknote BN during the emission of light from the light source 11 (11b). At this time, the light receiving unit 13 can function as a sensor that has sensitivity to at least the wavelength band of the transmission light transmitted through the banknote BN and the wavelength band of the reflection light reflected by the banknote BN. The light receiving unit 13 may output an electrical signal according to the quantity of the received transmission light as the output data, or may output an electrical signal according to the quantity of the received reflection light as the output data. Specifically, the light receiving unit 13 may include a light receiving element. The light receiving element may receive transmission light and convert the transmission light to an electrical signal corresponding to the quantity of the incident transmission light or may receive reflection light and convert the reflection light to an electrical signal corresponding to the quantity of the incident reflection light. The light receiving unit 13 may output these electrical signals. The "quantity of light" means the physical quantity proportional to the radiant intensity and incidence time of the incident light.

The light receiving unit 13 may use the same light receiving element to receive transmission light transmitted through the banknote BN and reflection light reflected by the banknote BN. This enables determination of whether or not a multifeed of banknotes BN has occurred based on light transmitted through a certain position of a banknote BN and light reflected at substantially the same position of the banknote BN, thus enabling more accurate detection of a multifeed of banknotes BN.

Transmission light transmitted through the banknote BN and reflection light reflected by the banknote BN that are received by the light receiving unit 13 may be lights based on the lights having the same wavelength emitted from the light source 11. For example, transmission light and reflection light that are received by the light receiving unit 13 may respectively be light having a certain wavelength emitted from the light source 11a and transmitted through the banknote BN and light having the same wavelength emitted from the light source 11b and reflected by the banknote BN. In these cases, the light receiving unit 13 may receive the transmission light transmitted through the banknote BN and the reflection light reflected by the banknote BN at different timings. Specifically, the light receiving period for receiving transmission light and the light receiving period for receiving reflection light may not coincide with each other. The "light receiving period" means a period from the start to the end of light reception. The start of light reception may be start of exposure of the light receiving element to light. The end of light reception may be end of the exposure of the light receiving element to light.

Figure 2:
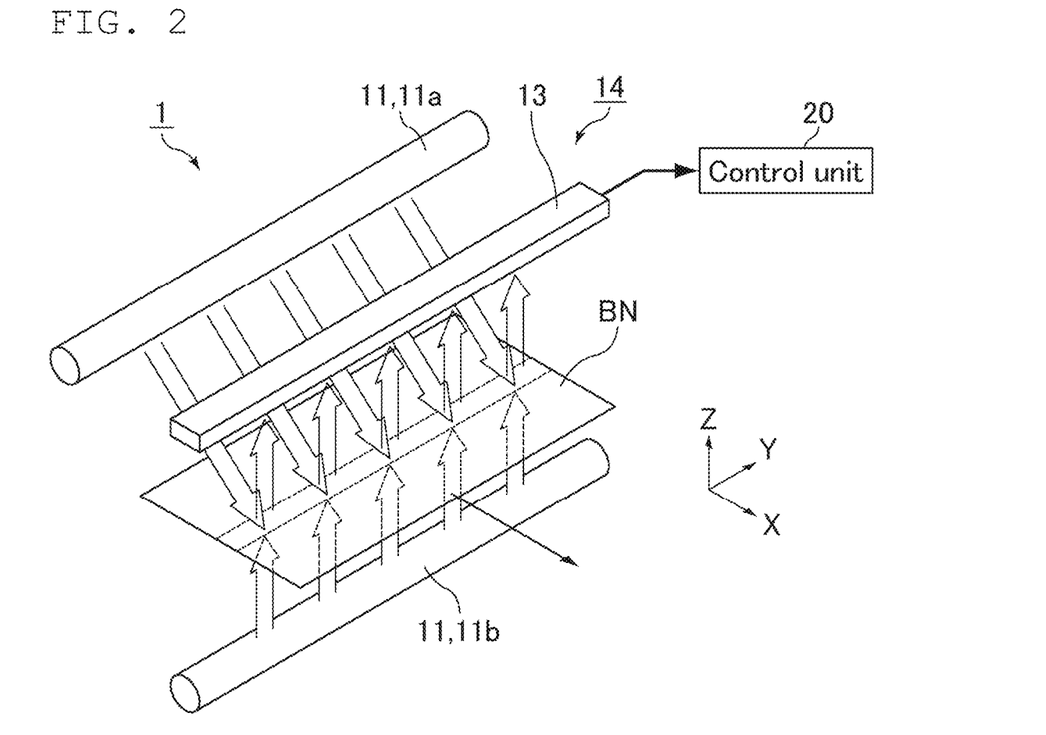
FIG. 2 is a schematic oblique view showing an example of the configuration of the multifeed detection device according to Embodiment 1.

FIG. 2 is a schematic oblique view showing an example of the configuration of the multifeed detection device according to the present embodiment. As shown in FIG. 2, the light source 11 and the light receiving unit 13 may define an optical line sensor 14 lying in the Y direction. In this case, the Y direction corresponds to the main scanning direction of the optical line sensor 14, and the X direction corresponds to the sub-scanning direction of the optical line sensor 14. The light source 11 (the light sources 11a and 11b) may emit light in a pattern linearly extending in the Y direction. The light receiving unit 13 may include a plurality of light receiving elements (light receiving pixels) arranged in a line in the Y direction, and may define a linear image sensor.

The lengths of the light source 11 (the light sources 11a and 11b) and the light receiving unit 13 in the Y direction (main scanning direction) may be longer than the length of a banknote BN in the Y direction. The light source 11 (the light sources 11a and 11b) may irradiate the entire banknote BN in the Y direction with light emitted in a linear pattern, and the light receiving unit 13 may receive light transmitted through or reflected by the entire banknote BN in the Y direction. In other words, the light receiving unit 13 may output an electrical signal corresponding to the quantity of incident light from a plurality of channels (columns) corresponding to the light receiving elements (positions in the Y direction). The channels (columns) are numbers assigned in order to the light receiving elements in the Y direction. Here, the light receiving unit 13 may output, as the output data, line data that is data of lights simultaneously received by the channels. While a banknote BN is transported in the X direction (sub-scanning direction), irradiation with light from the light source 11 (the light sources 11a and 11b) and reception of light by the light receiving unit 13 may be repeated, so that data of reflection light by the entire surface A of the banknote BN may be acquired.

Figure 3:
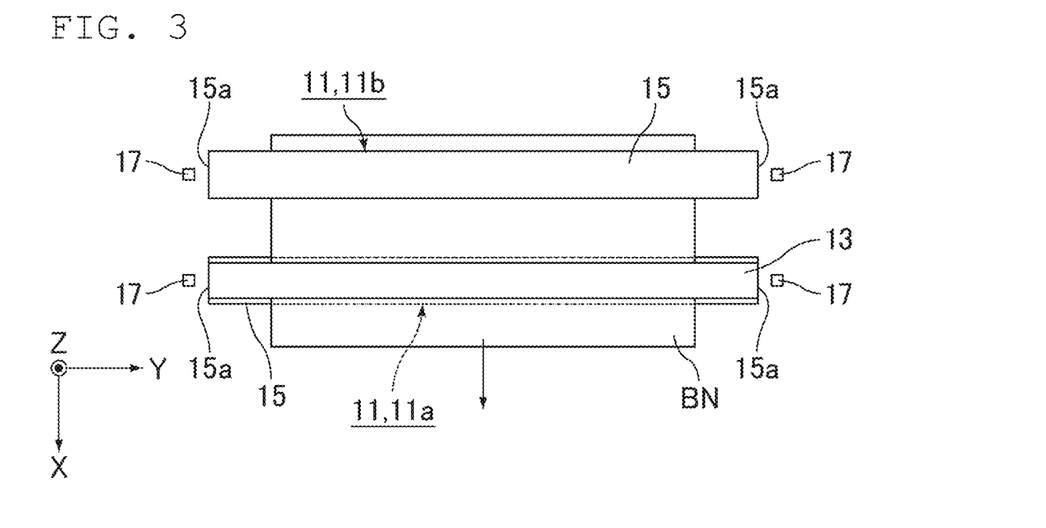
FIG. 3 is a schematic top view of the transport path for banknotes, showing an example of the configuration of the multifeed detection device according to Embodiment 1.

FIG. 3 is a schematic top view of the transport path for banknotes, showing an example of the configuration of the multifeed detection device according to the present embodiment. As shown in FIG. 3, the light source 11 (each of the light sources 11a and 11b) may include a light guide 15 and light-emitting elements 17 facing the two respective end surfaces 15a of the light guide 15, and may irradiate a banknote BN with light via the light guide 15.

The light guide 15 is a transparent rod-shaped optical component that guides light from the light-emitting elements 17 to emit light in a linear pattern toward the banknote BN as an irradiation target. The light guide 15 distributes light from the light-emitting elements 17 in a linear pattern.

Each of the light-emitting elements 17 is an element that emits light toward the opposing end surface 15a and can be, for example, a light emitting diode (LED). A plurality of the light-emitting elements 17 may be corresponded to one end surface. The light-emitting element(s) 17 may be corresponded to only either one of the two end surfaces 15a of each light guide 15.

Each light receiving pixel of the light receiving unit 13 may include a light receiving element that has sensitivity to all of the wavelength bands different from one another or may include a plurality of types of light receiving elements that selectively receive lights having the wavelength bands different from one another. In the former case, the light source 11 may irradiate a banknote BN sequentially with lights having respective wavelengths and the light receiving unit 13 may receive the lights having respective wavelengths in order according to the timings of emission of the lights. In the latter case, the light source 11 may irradiate a banknote BN simultaneously with lights having respective wavelengths, and the light receiving unit 13 may receive the lights having respective wavelengths using different types of light receiving elements.

Figure 4:
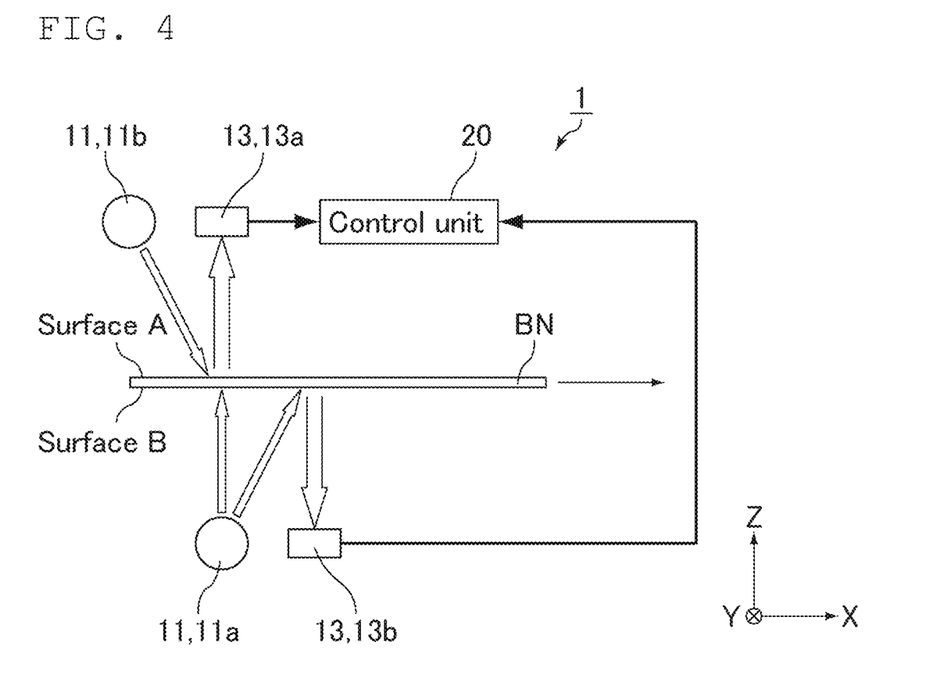
FIG. 4 is a schematic side view of the transport path for banknotes, showing an example of the configuration of the multifeed detection device according to Embodiment 1.

FIG. 4 is a schematic side view of the transport path for banknotes, showing an example of the configuration of the multifeed detection device according to the present embodiment. As shown in FIG. 4, the light receiving unit 13 may receive reflection light emitted from the light source 11 (11b) and reflected by the surface A of a banknote BN and reflection light emitted from the light source 11 (11a) and reflected by the surface B of the banknote BN. The light receiving unit 13 may include a light receiving unit (light receiver) 13a and a light receiving unit (light receiver) 13b. The light receiving unit 13a and the light source 11b are on the same side of the banknote BN. The light receiving unit 13b and the light source 11a are on the same side of the banknote BN. The light receiving unit 13a may receive transmission light emitted from the light source 11 (11a) toward the surface B of the banknote BN and transmitted through the banknote BN during the emission of light from the light source 11 (11a), and may receive light emitted from the light source 11 (11b) and reflected by the surface A of the banknote BN during the emission of light from the light source 11 (11b). The light receiving unit 13b may receive light emitted from the light source 11 (11a) and reflected by the surface B of the banknote BN during the emission of light from the light source 11 (11a).

The reflection light reflected by the surface A of the banknote BN to be received by the light receiving unit 13a and the reflection light reflected by the surface B of the banknote BN to be received by the light receiving unit 13b may be lights based on lights having the same wavelength.

For example, reflection lights reflected by the surface A and surface B of the banknote BN to be received respectively by the light receiving units 13a and 13b may respectively be lights resulting from reflection of lights having the same wavelength from the light sources 11b and 11a by the surface A and surface B of the banknote BN.

The light source 11a may separately include a light source for transmission light to be transmitted through a banknote BN and a light source for reflection light to be reflected by the surface B of a banknote BN, and these light sources may be arranged side by side in the transport direction of banknotes BN.

Also in the case shown in FIG. 4, as shown in FIG. 2 and FIG. 3, the light source 11 and the light receiving unit 13 may define an optical line sensor 14 lying in the Y direction. In other words, the light receiving unit 13b may include a plurality of light receiving elements (light receiving pixels) arranged in a line in the Y direction, and may define a linear image sensor. The length of the light receiving unit 13b in the Y direction (main scanning direction) may be longer than the length of a banknote BN in the Y direction. The light source 11a may irradiate the entire surface B of the banknote BN in the Y direction with light emitted in a linear pattern, and the light receiving unit 13b may receive light reflected by the entire surface B of the banknote BN in the Y direction. In other words, the light receiving unit 13b may output an electrical signal corresponding to the quantity of incident light from a plurality of channels (columns) corresponding to the light receiving elements (positions in the Y direction). Here, the light receiving unit 13b may output, as the output data, line data that is data of lights simultaneously received by the channels. While a banknote BN is transported in the X direction (sub-scanning direction), irradiation with light from the light source 11a and reception of light by the light receiving unit 13b may be repeated, so that data of reflection light by the entire surface B of the banknote BN may be acquired.

The control unit 20 executes processing of acquiring the output data from the light receiving unit 13. Specifically, the control unit 20 acquires, from the light receiving unit 13, transmission output data that is output data of transmission light received by the light receiving unit 13 and reflection output data that is output data of reflection light received by the light receiving unit 13. In other words, the control unit 20 acquires data (transmission output data) corresponding to the quantity of transmission light received by the light receiving unit 13 and data (reflection output data) corresponding to the quantity of reflection light received by the light receiving unit 13. The output data from the light receiving unit 13 to be acquired by the control unit 20 may be digitalized data. The control unit 20 may also acquire, as reflection output data, reflection output data of light reflected by the surface A of a banknote BN and output data of light reflected by the surface B of the banknote BN.

The light receiving unit 13, as described above, may include a plurality of light receiving pixels (light receiving elements). In this case, the control unit 20 may acquire transmission image data including output data from the plurality of light receiving pixels as the transmission output data, and may acquire reflection image data including output data from the plurality of light receiving pixels as the reflection output data. The transmission image data and the reflection image data are respectively image data of a banknote BN based on light transmitted through the banknote BN and image data of the banknote BN based on light reflected by the banknote BN. The control unit 20 may also acquire image data of the entire banknote BN as the transmission image data and the reflection image data. In other words, the control unit 20 may acquire transmission image data of the entire banknote BN and reflection image data of the entire banknote BN. In addition, the control unit 20 may acquire, as the reflection image data, reflection image data of the surface A (which may be the entire surface A) of the banknote BN and reflection image data of the surface B (which may be the entire surface B) of the banknote BN.

Figure 5:
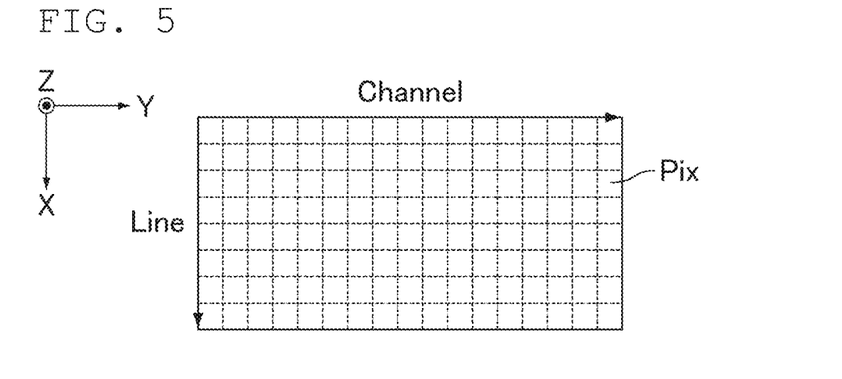
FIG. 5 is a schematic view showing image data of an entire banknote.

FIG. 5 is a schematic view showing image data of an entire banknote. The image data (transmission image data or reflection image data) of the entire banknote BN is data (two-dimensional data) obtained by capturing the entire banknote BN. As shown in FIG. 5, the image data may be defined by a plurality of pixels Pix arranged in a matrix pattern in the Y direction (main scanning direction) and the X direction (sub-scanning direction). The address of each pixel Pix may be identified using a channel (column) and a line (row). A channel corresponds to a position in the Y direction, represented by a channel in the light receiving unit 13. A line corresponds to a position in the X direction, represented by one of numbers assigned in order to line data sequentially output from the light receiving unit 13.

The control unit 20 may be a controller that controls the components of the multifeed detection device 1, and may be defined by programs for executing various processings, including the multifeed detection program, a central processing unit (CPU) that executes the programs, and various hardware devices (e.g., field programmable gate array (FPGA)) controlled by the CPU.

The control unit 20 executes processing of determining whether or not a multifeed of banknotes BN has occurred based on the transmission output data and the reflection output data acquired from the light receiving unit 13 (hereinafter, the processing may also be referred to as multifeed determination processing). The multifeed determination processing includes determining whether or not a multifeed of banknotes BN has occurred based not only on the transmission output data but also on the reflection output data, thus reducing erroneous detection where a soiled note is detected as two or more overlaid banknotes BN transported. Thus, the processing allows more accurate detection of a multifeed of banknotes BN. Specifically, although there may be no significant difference in transmission output level from the light receiving unit 13 between one soiled note and two fit notes, there should be a significant difference in reflection output level from the light receiving unit 13 between one soiled note and two fit notes. This is because more light components are absorbed by one soiled note without being transmitted through the one soiled note whereas more light components are reflected by two fit notes without being transmitted through the two fit notes. Thus, the erroneous detection can be reduced by a technique with a focus on the relationship between the transmission output level and the reflection output level from the light receiving unit 13. This means that a multifeed of banknotes BN can be more accurately detected by determining whether or not a multifeed of banknotes BN has occurred based on the transmission output data and the reflection output data acquired from the light receiving unit 13.

There is a possibility that no difference is found in reflection output level from the light receiving unit 13 between the case of one soiled note and the case of two soiled notes. Still, the transmission output level from the light receiving unit 13 more decreases in the case of two soiled notes than in the case of two fit notes, so that two soiled notes can be detected without any problem based on the transmission output data and the reflection output data.

The term "multifeed" means feeding of two or more overlaid sheets transported. In other words, the control unit 20 in the multifeed determination processing may determine whether one banknote BN is transported or two or more overlaid banknotes BN are transported. Two or more multifed sheets may be overlaid to any extent and may be, for example, overlaid such that there is no portion with only one sheet (e.g., the outlines of all the sheets may match) or overlaid such that there is a portion with only one sheet (e.g., two or more sheets may overlap one another).

The control unit 20 in the multifeed determination processing may execute processing of determining whether or not a multifeed has occurred for each unit pixel based on transmission image data and reflection image data (hereinafter, the processing may also be referred to as pixel determination processing) and processing of determining whether or not a multifeed of banknotes BN has occurred based on the results of the pixel determination processing (hereinafter, the processing may also be referred to as evaluation processing). This allows evaluation of whether or not a multifeed has occurred without being influenced by the patterns and the like of banknotes BN. Thus, a multifeed of banknotes BN is detectable at a stage where the type (denomination) of the target banknote BN is not yet recognized.

A "unit pixel" means a single pixel defining image data or a predetermined number (integer of 2 or greater) of consecutive (adjacent) pixels defining image data. The "predetermined number of consecutive pixels" may be pixels of n rows×n columns (where n is an integer of 2 or greater).

The resolution of the transmission image data and the reflection image data to be used by the control unit 20 in the pixel determination processing may be the same as or different from the resolution of the output data from the light receiving unit 13, and may be, for example, lower than the resolution of the output data from the light receiving unit 13 in the Y direction (main scanning direction) and the X direction (sub-scanning direction).

As described above, in the multifeed determination processing, the control unit 20 may determine, for each unit pixel defining the image data of a banknote BN, whether or not the unit pixel corresponds to a pixel defining image data of multifed banknotes BN.

Hereinbelow, in the pixel determination processing, a unit pixel determined as a unit pixel at which a multifeed has occurred may also be referred to as a "two-note pixel", and a unit pixel not determined as a unit pixel at which a multifeed has occurred may also be referred to as a "one-note pixel".

The control unit 20 in the pixel determination processing may determine whether or not a multifeed has occurred for each unit pixel based on the transmission image data of the entire banknote BN and the reflection image data of the entire banknote BN.

The control unit 20 in the pixel determination processing may use, as the reflection image data, reflection image data of the surface A of the banknote BN and reflection image data of the surface B of the banknote BN, or both-side reflection image data that is obtained by summing up the reflection image data of the surface A of the banknote BN and the reflection image data of the surface B of the banknote BN. This can make the detection less susceptible to the influence of the patterns and the like of the banknote BN. Thus, a multifeed of banknotes BN is detectable with higher accuracy at a stage where the type (denomination) of the target banknote BN is not yet recognized.

Specifically, for example, the both-side reflection image data may be data obtained by summing up the pixel value of each unit pixel in the reflection image data of the surface A of the banknote BN and the pixel value of the corresponding unit pixel in the reflection image data of the surface B of the banknote BN (i.e., pixel values of the corresponding unit pixels at the same address).

When a unit pixel is defined by a predetermined number of consecutive pixels, the pixel value of the unit pixel may be, for example, the average of the pixel values of the predetermined number of consecutive pixels or the integral value (total value) of the pixel values of the predetermined number of consecutive pixels.

The "pixel value" of a pixel represents the luminance information (degree of brightness or concentration) of the pixel and is representable by the predetermined grayscale levels (e.g., 256-level grayscale).

The control unit 20 in the pixel determination processing may also determine whether or not a multifeed has occurred for each unit pixel using, in addition to the transmission image data and the reflection image data, multiplication data that is obtained by multiplying the transmission image data by the reflection image data. This can improve the performance of distinguishing two-note pixels from one-note pixels. Thus, the detection accuracy of a multifeed of banknotes BN can be further increased.

Specifically, for example, the multiplication data may be data obtained by multiplying the pixel value of each unit pixel in the transmission image data and the pixel value of the corresponding unit pixel in the reflection image data (i.e., pixel values of the corresponding unit pixels at the same address). Also, for example, the multiplication data may be data obtained by multiplying the pixel value of each unit pixel in the transmission image data and the pixel value of the corresponding pixel unit in the both-side reflection image data (i.e., pixel values of the corresponding unit pixels at the same address).

The control unit 20 may determine that a multifeed has occurred at a unit pixel in question (hereinbelow, the determination processing may also be referred to as second determination processing) when determining that a multifeed has occurred at the unit pixel in question (hereinbelow, the determination processing may also be referred to as first determination processing) and more than a predetermined number of unit pixels for which the control unit 20 determines that a multifeed has occurred is present around the unit pixel in question. A position where a multifeed of banknotes BN has occurred typically has a certain amount of area. Thus, the above configuration allows prevention of erroneous determination that a multifeed has occurred in a very small region (e.g., one unit pixel). In this case, the control unit 20 in the pixel determination processing (second determination processing) may determine that a multifeed has not occurred at the unit pixel in question when not more than a predetermined number of unit pixels for which the control unit 20 determines that a multifeed has occurred is present around the unit pixel in question.

Specifically, for example, the control unit 20 may determine that a multifeed has occurred at a unit pixel (2, 2) in question where the unit pixel (2, 2) in question is the central unit pixel among 3 (row)×3 (column) unit pixels when the control unit 20 determines that a multifeed has occurred at the unit pixel (2, 2) in the first determination processing and that a multifeed has occurred at more than a predetermined number of unit pixels among the eight unit pixels around the unit pixel (2, 2) in the second determination processing, while the control unit 20 may determine that a multifeed has not occurred at the unit pixel (2, 2) when the control unit 20 determines that a multifeed has occurred at not more than a predetermined number of unit pixels among the eight unit pixels around the unit pixel (2,2) in the second determination processing. The predetermined number here may be any number and settable as appropriate. The predetermined number may be, for example, 3 or 4.

The first determination processing may be executed based on the later-described recognition function. The second determination processing may be executed based on processing of convolution using filters with a filter size of m×m (where m is an integer of 2 or greater, e.g., 3) and with every kernel value being 1.

As described above, the control unit 20 in the pixel determination processing may first determine whether or not a multifeed has occurred for every unit pixel based on the transmission image data and the reflection image data. Then, the control unit 20 may further determine the connectivity of unit pixels for which the control unit 20 determines that a multifeed has occurred. The control unit 20 may determine a unit pixel as a two-note pixel when the connectivity meets the predetermined criteria while re-determining the unit pixel as a one-note pixel when the connectivity does not meet the criteria.

The control unit 20 in the pixel determination processing (which may also be the first determination processing) may determine whether or not a multifeed has occurred for each unit pixel based on a recognition function. This allows detection of a multifeed of banknotes BN regardless of the type (denomination) of the target banknote BN.

Specifically, the control unit 20 may input the transmission image data and the reflection image data as feature amounts into the recognition function and, based on the output of the recognition function, determine whether or not a multifeed has occurred for each unit pixel. For example, the pixel value $x^T_{i,j}$ in the transmission image data and the pixel value $x^R_{i,j}$ in the reflection image data may be input into the recognition function. The i and j respectively represent numbers indicating the line (row) and the channel (column) of the target unit pixel.

The reflection image data to be input into the recognition function may be both-side reflection image data. For example, the total value $(x^{RA}_{i,j}+x^{RB}_{i,j})$ obtained by summing up the pixel value $x^{RA}_{i,j}$ of each unit pixel in the reflection image data of the surface A of the banknote BN and the pixel value $x^{RB}_{i,j}$ of the corresponding unit pixel in the reflection image data of the surface B of the banknote BN may be input into the recognition function.

Multiplication data may further be used as the feature amounts to be input into the recognition function. In other words, the transmission image data, the reflection image data, and the multiplication data may be input into the recognition function. For example, the value $(x^T_{i,j} \times x^R_{i,j})$ obtained by multiplying the pixel value $x^T_{i,j}$ of each unit pixel in the transmission image data by the pixel value $x^R_{i,j}$ of the corresponding unit pixel in the reflection image data may further be input into the recognition function.

When the multiplication data is further used, the reflection image data may be both-side reflection image data. For example, the value $(x^T_{i,j} \times (x^{RA}_{i,j}+x^{RB}_{i,j}))$ obtained by multiplying the pixel value $x^T_{i,j}$ of each unit pixel in the transmission image data by the total value $(x^{RA}_{i,j}+x^{RB}_{i,j})$ of the corresponding unit pixels in the reflection image data may further be input into the recognition function.

The recognition function may be based on a machine-learned function generated using one-note data based on transmission image data and reflection image data of one fit note of a certain type and two-note data based on transmission output data and reflection output data of two fit notes of the certain type. A decent number of soiled notes is typically difficult to obtain. Still, the above configuration allows generation of a recognition function using the one-note data and the two-note data, which are training data based on fit notes, even when a decent number of soiled notes is not available.

The "one-note data" is data including transmission image data and reflection image data each collected by simply transporting only one fit note. The "two-note data" is data including transmission image data and reflection image data each collected by transporting two overlaid fit notes. In collecting two-note data, light is less transmitted and the quantity of transmission light decreases since there are two notes. The decrease in quantity of transmission light means an increase in quantity of reflection light. Also in collecting one-note data and two-note data, any pixel corresponding to a clear window (transparent portion) or a hologram, for example, may be excluded as outliers. In addition, in collecting one-note data, any pixel with significantly low transmission output level may be excluded. One-note data may be two-dimensional data obtained using as two variables a pixel value in the transmission image data and a pixel value in the reflection image data of one fit note (i.e., pixel values of unit pixels at the same address). Two-note data may be two-dimensional data obtained using as two variables a pixel value in the transmission image data and a pixel value in the reflection image data of two fit notes (i.e., pixel values of unit pixels at the same address).

For the generation of a recognition function, for example, discriminant analysis, a support vector machine, or a neural network is usable.

When both-side reflection image data is used as feature amounts to be input into the recognition function, the machine learning may also be executed using, as the reflection image data included in one-note data and two-note data, the data on the total values each obtained by summing up the pixel value of each unit pixel in the reflection image data of the surface A of one fit note and the pixel value of the corresponding unit pixel in the reflection image data of the surface B of the one fit note, and the data on the total values each obtained by summing up the pixel value of each unit pixel in the reflection image data of the surface A of the two fit notes and the pixel value of the corresponding unit pixel in the reflection image data of the surface B of the two fit notes.

When multiplication data is further used as the feature amounts to be input into the recognition function, the machine learning may also be executed using one-note data and two-note data each including the data obtained by multiplying the pixel value of each unit pixel in the transmission image data of one fit note by the pixel value of the corresponding unit pixel in the reflection image data (which may be both-side reflection image data) of the one fit note, and the data obtained by multiplying the pixel value of each unit pixel in the transmission image data of the two fit notes by the pixel value of the corresponding unit pixel in the reflection image data (which may be both-side reflection image data) of the two fit notes.

As described above, the machine-learned function generated using one-note data and two-note data is a function best distinguishes between one fit note and the two fit notes. The present embodiment requires, however, distinguishment between a soiled note and two fit notes. Thus, a function barely distinguishing two fit notes from one fit note and a soiled note may be calculated and used as a recognition function. In other words, only the distribution closer to the one-note data in distribution of two-note data may be taken into consideration and the distribution farther from the one-note data may not be taken into consideration.

Specifically, the constant term $w_0$ in the machine-learned function may be changed such that the function passes through a position corresponding to $\mu+k\times\sigma$, where $\mu$ and $\sigma$ respectively represent an average and a standard deviation of output value distribution obtained by inputting the two-note data into the machine-learned function, and k represents a coefficient of 1 or greater and 3 or smaller. In other words, the recognition function may pass through a position corresponding to $\mu+k\times\sigma$ or may be one obtained by changing the constant term $w_0$ of the machine-learned function such that the function passes through the position corresponding to $\mu+k\times\sigma$. This makes the recognition function closer to two-note data than to one-note data, allowing reduction in possibility of erroneously detecting one note as two notes. k may be 1.5 or greater and 2.5 or smaller, and may be 2, for example. k=2 is sufficient for detection of two notes because, regardless of the distribution of two-note data, the two-note data includes 80% of the data when $X-\mu \geq 2\sigma$ (where X is the output value obtained by inputting the two-note data into the machine-learned function).

The control unit 20 in the evaluation processing may calculate the sum of two-note pixels determined in the pixel determination processing and then compare the sum with the predetermined threshold. Based on the result of comparison, the control unit 20 may determine whether or not a multifeed of banknotes BN has occurred. For example, when the sum of two-note pixels exceeds the threshold, the control unit 20 may determine that a multifeed of banknotes BN has occurred, while when the sum of the two-note pixels does not exceed the threshold, the control unit 20 may determine that a multifeed of banknotes BN has not occurred (one banknote BN is transported).

Specifically, the control unit 20 in the multifeed determination processing may determine whether or not a multifeed of banknotes BN has occurred based on the following formulas (1) to (6).

[Math. 1]

$$\text{Result} = \begin{cases} \text{Pass} & (\lambda \leq N) \\ \text{Fail} & (\text{otherwise}) \end{cases} \quad (1)$$

$$\lambda = \sum_{j \in LN} \sum_{i \in CH} P'_{i,j} \quad (2)$$

$$P'_{i,j} = \begin{cases} 1 & \left(\sum_{t=-1}^{1}\sum_{s=-1}^{1} 1 \cdot P_{i+s,j+t} > n\right) \\ 0 & (\text{otherwise}) \end{cases} \quad (3)$$

$$P_{i,j} = \begin{cases} 1 & (\omega \cdot \varphi\,(x_{i,j}) > c) \\ 0 & (\text{otherwise}) \end{cases} \quad (4)$$

$$\omega = (w_0, w_1, w_2) \quad (5)$$

$$\varphi\,(x_{i,j}) = \left(1, x_{i,j}^T, x_{i,j}^R\right)^T \quad (6)$$

In the formula (1), N is the threshold. The control unit 20 determines that a multifeed of banknotes BN has not occurred when $\lambda$ is not greater than N, while determining that a multifeed of banknotes BN has occurred when $\lambda$ exceeds N.

In the formulas (1) and (2), $\lambda$ is an evaluation value, and the sum of unit pixels $P'_{i,j}$ at all lines (LN) and all channels (CH) is calculated.

In the formulas (2) and (3), $P'_{i,j}$ is the result of convolution processing relative to the connectivity of two-note pixels, and n is the threshold of the result of convolution processing. When the result of convolution processing exceeds n, the control unit 20 determines that a pixel is a two-note pixel as shown in the result of the formula (4). When the result of convolution processing does not exceed n, the control unit 20 redetermines that the pixel is a one-note pixel without employing the result of the formula (4).

In the formulas (3) and (4), $P_{i,j}$ is the result of the recognition function $\omega \cdot \varphi(x_{i,j})$ and c is the threshold of the classification score which is the output of the recognition function. When the classification score exceeds c, the pixel is determined as a two-note pixel. When the classification score does not exceed c, the pixel is determined as a one-note pixel.

The recognition function is represented by $\omega \cdot \varphi(x_{i,j})$, into which two-dimensional feature amounts are input as shown in the formula (6). In the formula (5), $\omega(w_0$ to $w_2)$ is a machine-learned coefficient vector (weight). Here, $w_0$ is a value obtained by changing the constant term of a machine-learned function such that the recognition function passes through the position corresponding to the average of the distribution of two-note data+$2\sigma$. $w_1$ to $w_2$ are the original machine-learned values. $\varphi(x_{i,j})$ represented by the formula (6) is a feature amount vector of a unit pixel$_{i,j}$ (where i and j respectively represent the numbers indicating the line (row) and the channel (column) of the target unit pixel). In the formula (6), $x^T_{i,j}$ is a pixel value of the target unit pixel$_{i,j}$ in the transmission image data, and $x^R_{i,j}$ is a pixel value of the target unit pixel$_{i,j}$ in the reflection image data. Here, the recognition function is represented by a linear recognition formula.

The control unit 20 in the multifeed determination processing may use the following formula (6') instead of the formula (6). In the formula (6'), $x^{RA}_{i,j}$ is a pixel value of the target unit pixel$_{i,j}$ in the reflection image data of the surface A of the banknote BN, and $x^{RB}_{i,j}$ is a pixel value of the target unit pixel$_{i,j}$ in the reflection image data of the surface B of the banknote BN. In this case, both-side reflection image data is input as the feature amounts into the recognition function and the recognition function is represented by a linear recognition formula.

[Math. 2]

$$\varphi(x_{i,j}) = (1, x_{i,j}^T, x_{i,j}^{RA} + x_{i,j}^{RB})^T \quad (6')$$

The control unit 20 in the multifeed determination processing may use the following formulas (5') and (6") instead of the formulas (5) and (6). In the formula (5'), $\omega(w_0$ to $w_3)$ is the machine-learned coefficient vector (weight) as in the formula (5) (here, $w_0$ is obtained by changing the constant term of the machine-learned function) In this case, three-dimensional feature amounts including multiplication data are input into the recognition function and the recognition function is represented by a formula obtained by expanding a linear recognition formula to a nonlinear model.

[Math. 3]

$$\omega = (w_0, w_1, w_2, w_3) \quad (5')$$

$$\varphi(x_{i,j}) = (1, x_{i,j}^T, x_{i,j}^R, x_{i,j}^T \times x_{i,j}^R)^T \quad (6")$$

The control unit 20 in the multifeed determination processing may use the formula (5') and the following formula (6'") instead of the formulas (5) and (6). In this case, three-dimensional feature amounts including both-side reflection image data and multiplication data are input into the recognition function and the recognition function is represented by a formula obtained by expanding a linear recognition formula to a nonlinear model.

[Math. 4]

$$\varphi(x_{i,j})=(1,x_{i,j}{}^T,x_{i,j}{}^{RA}+x_{i,j}{}^{RB},x_{i,j}{}^T\times(x_{i,j}{}^{RA}+x_{i,j}{}^{RB}))^T \qquad (6''')$$

The control unit 20 may execute processing of recognizing banknotes BN using transmission output data and/or reflection output data acquired from the light receiving unit 13 (hereinbelow, the processing may also be referred to as recognition processing). The contents of the recognition processing are not limited and may be, for example, in the case of banknotes, recognition of the denomination, authentication of the banknote, fitness determination, acquisition of the outline information and passage position information on the banknote, reading of the numbers, characters, and other symbols printed on the banknote, and other various functions.

Figure 6:
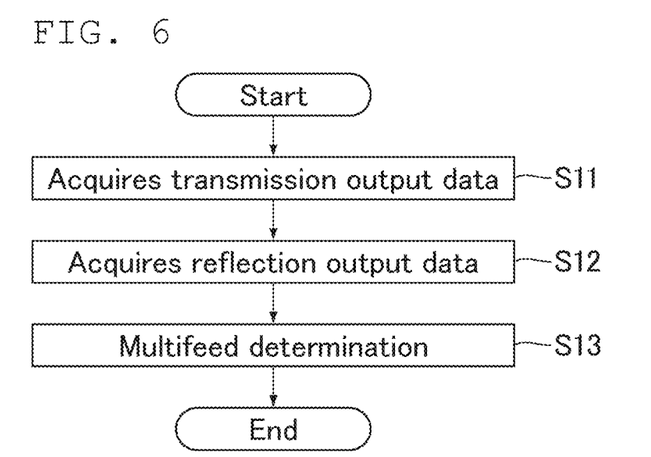
FIG. 6 is a flowchart showing an example of the operation of the multifeed detection device according to Embodiment 1.

Next, the operation of the multifeed detection device 1 according to the present embodiment is described with reference to FIG. 6. FIG. 6 is a flowchart showing an example of the operation of the multifeed detection device according to the present embodiment.

As shown in FIG. 6, first, the control unit 20 acquires transmission output data from the light receiving unit 13 (13a) having received light emitted from the light source 11 (11a) and transmitted through a banknote BN (step S11).

Next, the control unit 20 acquires reflection output data from the light receiving unit 13 (13a, 13a) having received light emitted from the light source 11 (11a, 11b) and reflected by the banknote BN (step S12).

The timing of executing step S11 and the timing of executing step S12 may be reversed or the same as each other.

Thereafter, the control unit 20 executes multifeed determination processing of determining whether or not a multifeed of banknotes BN has occurred based on the transmission output data and the reflection output data respectively acquired in step S11 and S12 (step S13), so that the operation of the multifeed detection device 1 ends.

Embodiment 2

Figure 7:
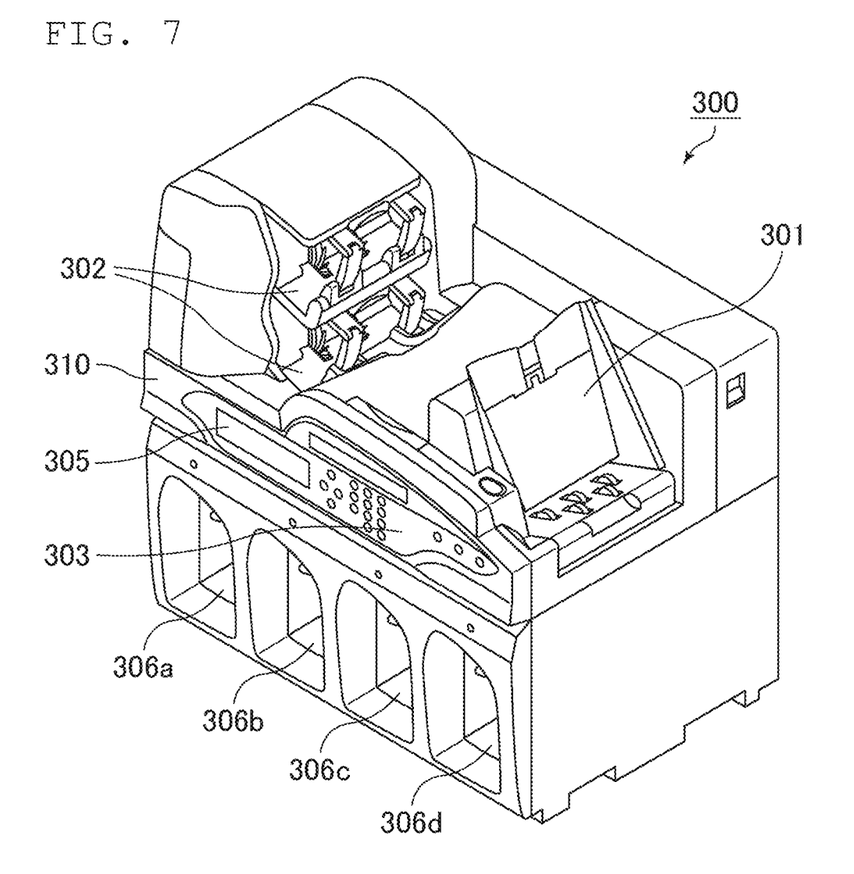
FIG. 7 is a schematic perspective view of the appearance of an example of a sheet handling device on which a multifeed detection device according to Embodiment 2 is mountable.

The configuration of a sheet handling device on which the multifeed detection device according to the present embodiment is mountable is described with reference to FIG. 7. FIG. 7 is a schematic perspective view of the appearance of an example of a sheet handling device on which the multifeed detection device according to the present embodiment is mountable. The sheet handling device on which the multifeed detection device according to the present embodiment is mountable may be, for example, one having the configuration shown in FIG. 7. A sheet handling device 300 shown in FIG. 7 includes the multifeed detection device according to the present embodiment (not shown in FIG. 7) that detects a multifeed of banknotes and executes processing of recognizing banknotes; a hopper 301 on which a plurality of banknotes to be handled is to be stacked; two rejectors 302 each of which feeds out a banknote that has been determined as a reject note; an operation unit 303 with which the operator inputs commands; four stackers 306a to 306d into each of which banknotes whose denomination, authenticity, and fitness have been recognized in the housing 310 are to be sorted and stacked; and a display 305 which displays information including the banknote recognition and counting results and the stacking status in each of the stackers 306a to 306d.

Figure 8:
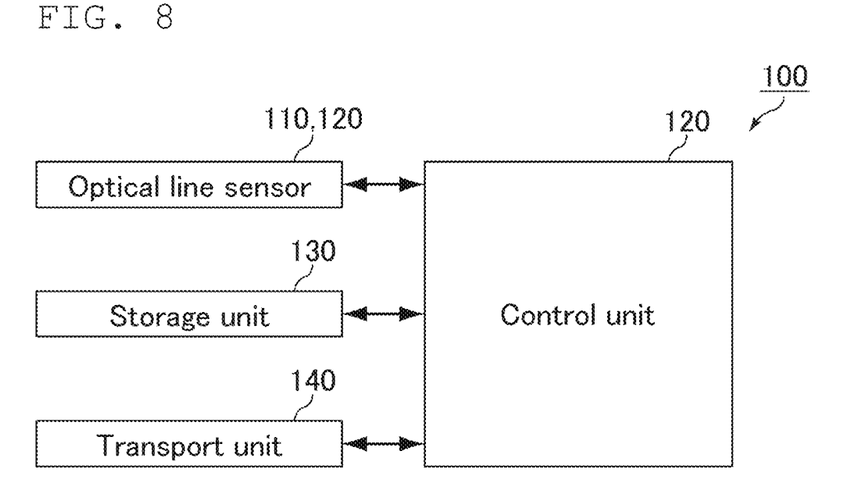
FIG. 8 is a block diagram showing an example of the configuration of the multifeed detection device according to Embodiment 2.

Next, the configuration of the multifeed detection device according to the present embodiment is described with reference to FIG. 8. FIG. 8 is a block diagram showing an example of the configuration of the multifeed detection device according to the present embodiment. As shown in FIG. 8, a multifeed detection device 100 according to the present embodiment includes optical line sensors 110 and 121, a control unit (controller) 120, a storage unit (memory) 130, and a transport unit 140.

The optical line sensors 110 and 121 detect various optical characteristics of transported banknotes, and may include a light source and a light receiving unit (light receiver) along the transport path of banknotes. The light source irradiates each banknote with lights having respective wavelengths. The light receiving unit receives the lights having respective wavelengths emitted from the light source in the same optical line sensor and reflected by the banknote, and outputs, by wavelength, reflection output data of the lights having respective wavelengths. The light receiving unit of the optical line sensor 110 receives lights having respective wavelengths emitted from the light source of the optical line sensor 121 and transmitted through the banknote and outputs, by wavelength, transmission output data of the lights having respective wavelengths.

The control unit 120 includes, for example, programs (including a multifeed detection program) for executing various processings stored in the storage unit 130, a CPU that executes the programs, and various hardware devices (e.g., FPGA) controlled by the CPU. The control unit 120 controls the components of the multifeed detection device 100 following the programs stored in the storage unit 130. The control unit 120 has a function of executing the programs stored in the storage unit 130 to execute acquisition processing of transmission output data and reflection output data from the light receiving units, multifeed determination processing based on the acquired transmission output data and reflection output data, recognition processing based on the acquired transmission output data and/or reflection output data, and other processing. The processings to be executed by the control unit 120 are the same as the processings to be executed by the control unit 20 described in Embodiment 1. Thus, detailed description thereof is omitted.

The control unit 120 executes, as the recognition processing, processing of recognizing at least the denomination and authenticity of a banknote. The control unit 120 may have a function of recognizing the fitness of a banknote. In this case, the control unit 120 detects a stained/soiled portion, a folded portion, a torn portion, or other defective portions of the banknote, so as to determine whether the banknote should be handled as a fit note suitable for circulation or as an unfit note unsuitable for circulation.

The storage unit 130 is defined by a nonvolatile and/or volatile storage device such as a semiconductor memory or a hard disk. The storage unit 130 stores programs and data necessary for the control of the multifeed detection device 100.

The transport unit 140 rotatably drives rollers or a belt, for example, to transport banknotes one by one along the transport path provided inside the multifeed detection device 100.

Figure 9:
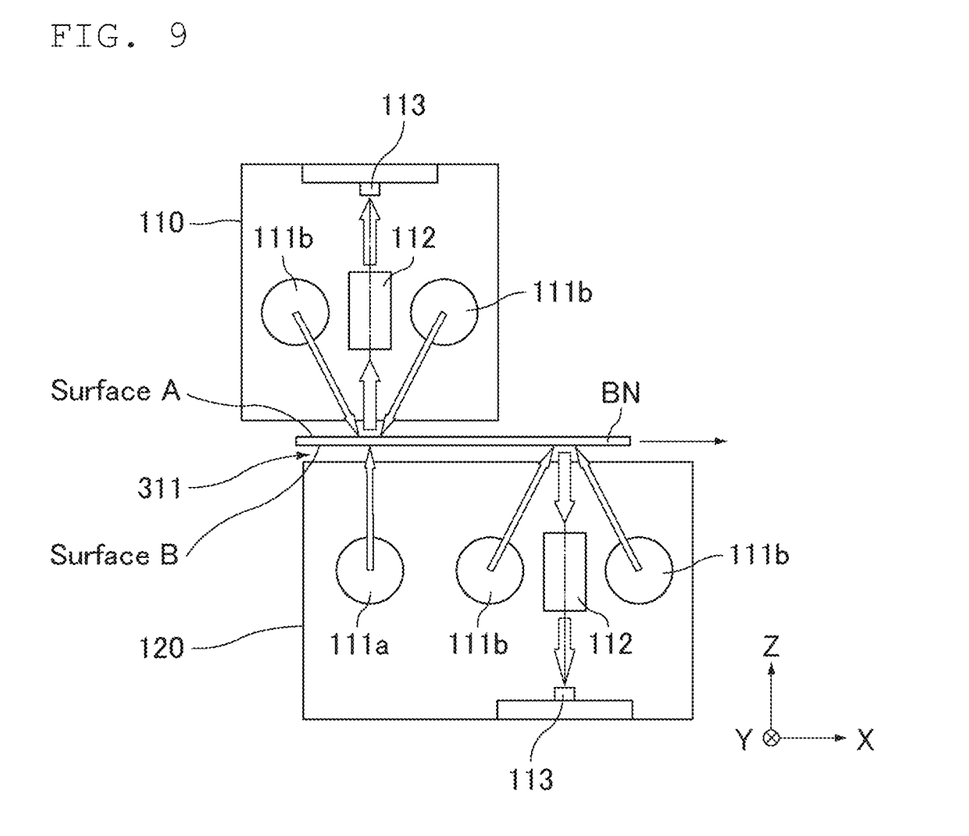
FIG. 9 is a schematic cross-sectional view showing an example of the configuration of optical line sensors included in the multifeed detection device according to Embodiment 2.

Next, the configurations of the optical line sensors 110 and 121 are described with reference to FIG. 9. FIG. 9 is a schematic cross-sectional view showing an example of the configuration of optical line sensors included in the multifeed detection device according to the present embodiment. As shown in FIG. 9, the multifeed detection device 100 includes the optical line sensors 110 and 121 opposing each other. The optical line sensors 110 and 121 each include a contact image sensor facing the transport path 311 in the sheet handling device according to the present embodiment. A space in which banknotes BN are transported in the X direction in the XY plane is formed between the optical line sensors 110 and 121 that are spaced from each other in the Z direction. This space defines part of the transport path 311 of the sheet handling device according to the present embodiment. The optical line sensors 110 and 121 are positioned above (+Z direction) and below (−Z direction) the transport path 311, respectively. The Y direction corresponds to the main scanning direction of the optical line sensors 110 and 121. The X direction corresponds to the sub-scanning direction of the optical line sensors 110 and 121.

As shown in FIG. 9, the optical line sensors 110 and 121 each include two reflection light sources 111b, a condensing lens 112, a light receiving unit (light receiver) 113, and a substrate 114. Each of the reflection light sources 111b, for example, includes a light guide extending in the main scanning direction and a plurality of types of light-emitting elements each facing either one of the end surfaces of the light guide. The light-emitting elements emit lights having respective wavelengths. The light source 111b of the optical line sensor 110 and the light source 111b of the optical line sensor 121 respectively irradiate the surface A and the surface B of a banknote BN sequentially with lights having respective wavelengths. The light sources 111b emit lights whose peak wavelengths are different from one another, for example, as the lights having respective wavelengths. Specifically, for example, infrared light (which may be a plurality of types of infrared lights whose peak wavelengths are different from one another), red light, green light, blue light, white light, ultraviolet light, and other light can be used. Each condensing lens 112, for example, is defined by a rod lens array including a plurality of rod lenses arrayed in the main scanning direction and condenses light emitted from the corresponding reflection light sources 111b and reflected by the surface A or surface B of the banknote BN. Each light receiving unit 113, for example, includes a linear image sensor including a plurality of light receiving elements (light receiving pixels) arrayed in the main scanning direction. Each light receiving element has sensitivity to the wavelength bands of the lights having respective wavelengths emitted from the light sources 111b. Each light receiving element can be, for example, a silicon (Si) photodiode sensitive to a wavelength range at least from the visible to infrared (wavelength of 1100 nm) range. Each light receiving element, mounted on the substrate 114, receives light condensed by the condensing lens 112, converts the light to an electrical signal according to the quantity of the incident light, and outputs the electrical signal to the substrate 114. Each light receiving element receives lights having the respective wavelengths from each of the light sources 111b based on the timings when the lights having the respective wavelengths are emitted. Each substrate 114 includes, for example, a drive circuit for driving light receiving elements and a signal processing circuit for processing signals from the light receiving elements and outputting the processed signals. The substrate 114 amplifies the signals output from the corresponding light receiving unit 113 (light receiving element), converts the amplified signals to digital data by A/D conversion, and outputs the data.

The optical line sensor 121 further includes one transmission light source 111a. The light source 111a is disposed on the optical axis of the condensing lens 112 of the optical line sensor 110. Part of light emitted from the light source 111a is transmitted through a banknote BN, condensed by the condensing lens 112 of the optical line sensor 110, and detected by the light receiving unit 113 of the optical line sensor 110. The light source 111a sequentially or simultaneously irradiates the surface B of the banknote BN with lights having respective wavelength bands. The light source 111a emits lights whose peak wavelengths are different from one another, for example, as the lights having respective wavelengths. Specifically, for example, infrared light, green light, and other light can be used.

The "lights having respective wavelengths" mean lights having different wavelength bands, and their peak wavelengths may be different from one another. The lights having respective wavelengths may be, for example, lights having different colors in the case of visible light, and lights having overlapping wavelength bands or lights having non-overlapping wavelength bands in the case of infrared light and ultraviolet light.

In the present embodiment, since the control unit 120 executes the same processings as the control unit 20 described in Embodiment 1, the control unit 120 can executes banknote recognition processing and can more accurately detect a multifeed of banknotes as in Embodiment 1. Also, since a multifeed of banknotes can be detected only with the optical line sensors 110 and 121 without a mechanical thickness detector that detects the thickness of banknotes, the present embodiment can contribute to cost reduction and improvement of banknote transportation quality. While having a high reliability, a multifeed detection method using a mechanical thickness detector involves a high cost and requires pressing of banknotes, and thus have an adverse effect on the banknote transportation quality.

Although the cases of detecting a multifeed of banknotes based on the relationship between the transmission output level and the reflection output level are described in the above embodiments, it is possible to detect a pixel in which the relationship between the transmission output level and the reflection output level is abnormal based on the same concept. Specifically, for example, a pixel corresponding to a special security thread, oil stain, a clear window, or a hologram, for example, may be detected.

The embodiments of the present disclosure have been described above with reference to the drawings. The present disclosure is not limited to these embodiments. The configurations of the embodiments may be combined or modified as appropriate within the spirit of the present disclosure.

As described above, the present disclosure provides a technique useful in detecting a multifeed of sheets.

What is claimed is:
1. A multifeed detection device, comprising;
a light source to irradiate a sheet with light;
a light receiver including a plurality of light receiving pixels configured to receive transmission light transmitted through a sheet and reflection light reflected by a sheet; and
a controller configured to
acquire, from the light receiver, transmission image data that is output data of the transmission light and includes output data from the plurality of light receiving pixels, and reflection image data that is output data of the reflection light and includes output data from the plurality of light receiving pixels;
determine a result indicating whether or not a multifeed has occurred for each unit pixel based on the transmission image data, the reflection image data and a recognition function; and determine whether or not a multifeed of sheets has occurred based on the result, the recognition function is based on a machine-learned function generated using:
one-sheet data based on transmission image data and reflection image data of one fit sheet of a certain type, and
two-sheet data based on transmission image data and reflection image data of two fit sheets of the certain type, and
the recognition function passes through a position corresponding to $\mu+k\times\sigma$, where $\mu$ is an average of an output value distribution obtained by inputting the two-sheet data into the machine-learned function, $\sigma$ is a standard deviation of the output value distribution, and k is a coefficient in which $1\leq k\leq 3$.

2. The multifeed detection device according to claim 1 wherein the controller is configured to determine that a multifeed has occurred at a unit pixel in question when determining that a multifeed has occurred at more than a predetermined number of unit pixels around the unit pixel in question.

3. The multifeed detection device according to claim 1, wherein the light receiver is configured to use a same light receiving element to receive the transmission light and the reflection light.

4. The multifeed detection device according to claim 1, wherein the transmission light and the reflection light are based on lights having a same wavelength emitted from the light source.

5. A multifeed detection method, comprising:
acquiring transmission image data from a light receiver including a plurality of light receiving pixels which receive transmission light emitted from a light source and transmitted through a sheet, the transmission image data being output data of the transmission light and includes output data from the plurality of light receiving pixels,
acquiring reflection image data from the light receiver having received reflection light emitted from the light source and reflected by a sheet, the reflection image data being output data of the reflection light and includes output data from the plurality of light receiving pixels;
determining a result indicating whether or not a multifeed has occurred for each unit pixel based on the transmission image data, the reflection image data and a recognition function; and
determining whether or not a multifeed of sheets has occurred based on the result, wherein
the recognition function is based on a machine-learned function generated using:
one-sheet data based on transmission image data and reflection image data of one fit sheet of a certain type, and
two-sheet data based on transmission image data and reflection image data of two fit sheets of the certain type, and
the recognition function passes through a position corresponding to $\mu+k\times\sigma$, where $\mu$ is an average of an output value distribution obtained by inputting the two-sheet data into the machine-learned function, $\sigma$ is a standard deviation of the output value distribution, and k is a coefficient in which $1\leq k\leq 3$.

* * * * *